(12) United States Patent
DeFelice et al.

(10) Patent No.: US 10,830,372 B1
(45) Date of Patent: Nov. 10, 2020

(54) PNEUMATIC CONTROLLERS, PNEUMATICALLY CONTROLLED INLINE VALVES, AND METHODS OF COOLING PNEUMATIC CONTROLLERS

(71) Applicant: Hamilton Sundstrand Corporation, Charlotte, NC (US)

(72) Inventors: Robert DeFelice, South Windsor, CT (US); Peter J. Dowd, Granby, CT (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 16/447,786

(22) Filed: Jun. 20, 2019

(51) Int. Cl.
*F16K 31/122* (2006.01)
*F16K 1/12* (2006.01)

(52) U.S. Cl.
CPC .......... *F16K 31/1223* (2013.01); *F16K 1/126* (2013.01); *F16K 31/1226* (2013.01); *Y10T 137/3367* (2015.04); *Y10T 137/3421* (2015.04); *Y10T 137/3476* (2015.04)

(58) Field of Classification Search
CPC ......... Y10T 137/3367; Y10T 137/3421; Y10T 137/3476; F04D 27/0215; F02C 6/08; F02C 9/18; F16K 31/50; F16K 1/126; F16K 31/1223; F16K 31/1226; G05D 7/0133; G05D 7/0146
See application file for complete search history.

(56) References Cited

U.S. PATENT DOCUMENTS

| | | | | |
|---|---|---|---|---|
| 1,362,331 A | * | 12/1920 | Larne | F16K 1/126 137/219 |
| 1,387,446 A | * | 8/1921 | Astier | F16K 1/12 137/219 |
| 1,441,784 A | * | 1/1923 | Clayton | F16K 1/12 137/330 |

(Continued)

FOREIGN PATENT DOCUMENTS

| | | |
|---|---|---|
| CN | 101315234 A | 12/2008 |
| CN | 205534367 U | 8/2016 |

(Continued)

OTHER PUBLICATIONS

European Search Report; EP Application No. 19212831; dated Jul. 22, 2020; 5 pages.

*Primary Examiner* — Marina A Tietjen
*Assistant Examiner* — Frederick D Soski
(74) *Attorney, Agent, or Firm* — Cantor Colburn LLP

(57) ABSTRACT

A pneumatic controller includes a manifold, a selector, and a biasing member. The manifold has a low pressure port, a high pressure port, an actuator port, and a vent. The selector is movable within the manifold between a first position and a second position, the low pressure port in fluid communication with the actuator port in the first position, the high pressure port in fluid communication with the actuator port in the second position. The biasing member is supported within the manifold and urges the selector towards the first position, wherein the low pressure port is in fluid communication with the vent in both the first position and the (Continued)

second position to cool the biasing member with low pressure fluid received at the low pressure port. Inline valves, gas turbine engines, and methods of controlling fluid flow through inline valves are also described.

17 Claims, 5 Drawing Sheets

(56) References Cited

U.S. PATENT DOCUMENTS

| | | | | |
|---|---|---|---|---|
| 1,448,717 A * | 3/1923 | Slattery | F16K 1/126 | 137/219 |
| 1,723,736 A * | 8/1929 | Kruse | F16K 1/126 | 137/220 |
| 1,777,060 A * | 9/1930 | Welcker | F16K 1/126 | 137/220 |
| 1,824,916 A * | 9/1931 | Moody | F16K 1/126 | 137/219 |
| 1,829,703 A * | 10/1931 | Larner | F16K 1/126 | 137/219 |
| 1,838,723 A * | 12/1931 | Welcker | F16K 1/12 | 137/220 |
| 1,841,608 A * | 1/1932 | Kruse | F16K 17/32 | 137/220 |
| 1,842,146 A * | 1/1932 | Brotherton | F16K 1/12 | 137/219 |
| 1,856,222 A * | 5/1932 | McClellan | F16K 1/126 | 137/220 |
| 1,941,357 A * | 12/1933 | Kruse | F16K 1/126 | 137/220 |
| 2,085,893 A * | 7/1937 | Boland | F16K 1/126 | 137/219 |
| 2,095,410 A * | 10/1937 | Diescher | F16K 1/12 | 137/220 |
| 2,133,983 A * | 10/1938 | Gaston | F16K 1/12 | 137/219 |
| 2,269,671 A * | 1/1942 | Kinzie | F03C 2/08 | 137/219 |
| 2,442,625 A * | 6/1948 | Thomas | F16K 1/12 | 137/219 |
| 2,608,204 A * | 8/1952 | Dunn | F16K 7/075 | 137/220 |
| 2,914,079 A * | 11/1959 | Elise | B04B 9/06 | 137/219 |
| 2,919,714 A * | 1/1960 | Mrazek | F16K 1/126 | 137/220 |
| 2,931,378 A * | 4/1960 | Davies | F16K 24/04 | 137/220 |
| 2,938,533 A * | 5/1960 | Jensen | F16K 1/126 | 137/219 |
| 2,943,636 A * | 7/1960 | Reed | E03B 9/04 | 137/220 |
| 2,950,732 A * | 8/1960 | Lambert | G05D 16/106 | 137/219 |
| 2,996,074 A * | 8/1961 | Page | F16K 31/363 | 137/220 |
| 3,003,516 A * | 10/1961 | Granberg | G01F 15/005 | 137/220 |
| 3,074,685 A * | 1/1963 | Eckert | F16K 47/00 | 251/77 |
| 3,076,471 A * | 2/1963 | Salerno | G05D 7/014 | 137/219 |
| 3,092,132 A * | 6/1963 | Guy | F16K 1/12 | 137/219 |
| 3,092,133 A * | 6/1963 | Clark | F16K 1/126 | 137/220 |
| 3,119,405 A * | 1/1964 | Guy | F16K 1/126 | 137/219 |
| 3,134,394 A * | 5/1964 | Ohta | F16K 15/06 | 137/220 |
| 3,155,108 A * | 11/1964 | Kahn | B64D 13/02 | 137/220 |
| 3,156,253 A * | 11/1964 | Marderness | F16K 1/126 | 137/220 |
| 3,172,420 A * | 3/1965 | Brown | F16K 1/126 | 137/219 |
| 3,177,889 A * | 4/1965 | Hardison | F16K 31/34 | 137/220 |
| 3,192,940 A * | 7/1965 | Wiersholm | G05D 7/03 | 137/220 |
| 3,194,255 A * | 7/1965 | Flaton | F16K 15/06 | 137/220 |
| 3,297,047 A * | 1/1967 | Sime | F16K 1/126 | 137/220 |
| 3,338,259 A * | 8/1967 | Tribe | F16K 1/126 | 137/220 |
| 3,359,998 A * | 12/1967 | Fike | F16K 1/126 | 137/220 |
| 3,380,469 A * | 4/1968 | Salerno | F16K 31/42 | 137/219 |
| 3,399,689 A * | 9/1968 | Keane | F16K 1/126 | 137/220 |
| 3,489,165 A * | 1/1970 | Salerno | G05D 16/166 | 137/220 |
| 3,490,484 A * | 1/1970 | Runton | F16K 1/126 | 137/219 |
| 3,534,769 A * | 10/1970 | Leveque | F16K 31/36 | 137/501 |
| 3,566,907 A * | 3/1971 | Sime | F16K 1/126 | 137/219 |
| 3,583,440 A * | 6/1971 | Andersson | F16K 31/1223 | 137/624.14 |
| 3,586,033 A * | 6/1971 | Hieber | B64D 39/06 | 137/220 |
| 3,617,151 A * | 11/1971 | Scroggins | F16K 1/126 | 417/18 |
| 3,643,685 A * | 2/1972 | Hays | F16K 1/126 | 137/501 |
| 3,643,707 A * | 2/1972 | Ensign | B67D 7/28 | 141/286 |
| 3,792,713 A * | 2/1974 | Zadoo | F16K 1/126 | 137/486 |
| 3,792,716 A * | 2/1974 | Sime | F16K 1/126 | 137/492 |
| 3,825,026 A * | 7/1974 | Salerno | F01D 17/145 | 137/219 |
| 3,865,128 A * | 2/1975 | Zadoo | F16K 1/126 | 137/220 |
| 3,901,266 A * | 8/1975 | Guy | G05D 7/0153 | 137/219 |
| 3,945,393 A * | 3/1976 | Teatini | F16K 1/126 | 137/220 |
| 3,963,044 A * | 6/1976 | Brown | F16K 31/363 | 137/490 |
| 3,987,812 A * | 10/1976 | Nelson | F16K 1/12 | 137/219 |
| 3,993,093 A * | 11/1976 | Mokveld | F16J 15/062 | 137/484.6 |
| 4,052,035 A * | 10/1977 | Kenny | B05B 1/302 | 251/14 |
| 4,077,425 A * | 3/1978 | Drori | F16K 31/363 | 137/219 |
| 4,094,334 A * | 6/1978 | Taylor | E21B 34/10 | 137/219 |
| 4,221,234 A * | 9/1980 | Kruschik | F16L 55/10 | 137/219 |
| 4,226,259 A * | 10/1980 | Szekely | F16K 31/365 | 137/269 |
| 4,285,495 A * | 8/1981 | King | F16K 1/126 | 137/219 |
| 4,373,544 A * | 2/1983 | Goodman | F04D 27/0215 | 137/220 |
| 4,429,709 A * | 2/1984 | Niskanen | G05D 7/03 | 137/220 |
| 4,479,507 A * | 10/1984 | Nichols | B67D 7/301 | 137/219 |
| 4,565,210 A * | 1/1986 | Heine | F16K 1/12 | 137/219 |

(56) References Cited

U.S. PATENT DOCUMENTS

| | | | | |
|---|---|---|---|---|
| 4,577,654 | A * | 3/1986 | Pringle | F16K 1/126 137/219 |
| 4,610,265 | A * | 9/1986 | Nelson | F16K 1/126 137/219 |
| 4,693,268 | A * | 9/1987 | Fahl | F16K 1/12 137/219 |
| 4,732,189 | A * | 3/1988 | Jones | F16K 31/1223 137/220 |
| 4,911,196 | A * | 3/1990 | Kemp | F16K 15/026 137/220 |
| 5,005,602 | A * | 4/1991 | Fahl | F16K 1/12 137/219 |
| 5,249,599 | A * | 10/1993 | Haynes | G05D 7/0133 137/501 |
| 5,441,171 | A * | 8/1995 | Maury | B65D 88/703 222/3 |
| 5,540,252 | A * | 7/1996 | Bruun | G05D 7/0146 137/220 |
| 5,603,352 | A * | 2/1997 | Tavor | F16K 1/126 137/594 |
| 5,803,356 | A * | 9/1998 | Babinger | F01P 11/16 137/219 |
| 5,826,613 | A * | 10/1998 | Schalk | F16K 1/123 137/219 |
| 5,921,276 | A * | 7/1999 | Lam | F16K 15/026 137/220 |
| 6,029,691 | A * | 2/2000 | Tavor | F16K 1/12 137/219 |
| 6,216,721 | B1 * | 4/2001 | Perez | F16K 1/126 137/219 |
| 6,230,734 | B1 * | 5/2001 | Grebnev | F16K 1/123 137/220 |
| 6,446,657 | B1 * | 9/2002 | Dziorny | F01D 17/105 137/219 |
| 8,656,941 | B1 * | 2/2014 | Hayward | F02K 9/58 137/221 |
| 9,033,306 | B2 * | 5/2015 | Kunau | B60C 25/145 141/38 |
| 9,080,832 | B2 * | 7/2015 | Brahler, II | F41H 13/0006 |
| 10,253,901 | B1 * | 4/2019 | Channpaigne | F16K 27/048 |
| 2002/0005217 | A1 * | 1/2002 | Lyons | G05D 7/014 137/220 |
| 2006/0054848 | A1 * | 3/2006 | Vogt | F02B 37/16 251/77 |
| 2007/0284002 | A1 * | 12/2007 | Hartman | F16K 3/265 137/219 |
| 2008/0224076 | A1 * | 9/2008 | Jennings | F16K 7/20 251/122 |
| 2009/0250123 | A1 * | 10/2009 | Matsubara | F16K 27/0209 137/528 |
| 2009/0272929 | A1 * | 11/2009 | Bey | F16K 1/126 251/324 |
| 2010/0102259 | A1 * | 4/2010 | Forster | F16K 31/0651 251/129.01 |
| 2010/0187462 | A1 * | 7/2010 | Davies, Jr. | F16K 1/12 251/318 |
| 2012/0061595 | A1 * | 3/2012 | Canjuga | F16K 1/126 251/62 |
| 2012/0090715 | A1 * | 4/2012 | Fenwick | F16K 31/50 137/801 |
| 2014/0124059 | A1 * | 5/2014 | McAuliffe | F16K 31/12 137/492 |
| 2015/0008348 | A1 * | 1/2015 | Greene | F16K 31/383 251/62 |
| 2016/0376913 | A1 * | 12/2016 | Marocchini | F04D 27/0223 137/511 |
| 2017/0342853 | A1 * | 11/2017 | Schwalm | F02C 6/08 |
| 2017/0363003 | A1 * | 12/2017 | Evetts | F02C 7/18 |
| 2017/0370488 | A1 * | 12/2017 | Reinholdt | G05D 16/103 |
| 2018/0073648 | A1 * | 3/2018 | Wong | F16K 1/126 |
| 2019/0154157 | A1 | 5/2019 | Villanueva et al. | |
| 2020/0041005 | A1 * | 2/2020 | Baumann | F16K 1/38 |
| 2020/0095944 | A1 * | 3/2020 | Goodman | F16K 31/1223 |

FOREIGN PATENT DOCUMENTS

| | | |
|---|---|---|
| EP | 0376115 A1 | 7/1990 |
| EP | 3056739 A1 | 8/2016 |
| WO | 3214083 A1 | 8/1992 |

* cited by examiner

PNEUMATIC CONTROLLERS, PNEUMATICALLY CONTROLLED INLINE VALVES, AND METHODS OF COOLING PNEUMATIC CONTROLLERS

STATEMENT OF FEDERAL SUPPORT

This invention was made with Government support under Contract No. FA8626-16-C-2139 awarded by the United States Air Force. The Government has certain rights in the invention.

BACKGROUND

The present disclosure generally relates to fluid systems, and more particularly to controlling fluid flow in fluid systems with inline valves.

Valves, such as pneumatically actuated valves, are commonly used to control the fluid flow in fluid systems. Such valves generally house an actuator with air conduits to allow the valve to open and close according to pressure at the valve inlet. When the inlet pressure is low an air conduit charged with low pressure air is connected to the actuator, which allows the low pressure air at the inlet to open the valve. As the inlet pressure rises a conduit charged with high pressure air is connected to the actuator, which causes the valve to close when the pressure of the air at the inlet rises above a predetermined pressure. Since the air provided to the valve may be relatively hot the actuator may require cooling and/or periodic service in order to function reliably during operation.

Such systems and methods valves have generally been acceptable for their intended purpose. However, there remains a need in the art for improved pneumatic controllers, inline valves, and methods of cooling pneumatic actuators in inline valves. The present disclosure provides a solution to this need.

BRIEF DESCRIPTION

A pneumatic controller for an inline valve includes a manifold, a selector, and a biasing member. The manifold has a low pressure port, a high pressure port, an actuator port, and a vent. The selector is movable within the manifold between a first position and a second position, the low pressure port in fluid communication with the actuator port in the first position, the high pressure port in fluid communication with the actuator port in the second position. The biasing member is supported within the manifold urges the selector towards the first position. The low pressure port is in fluid communication with the vent in both the first position and the second position to cool the biasing member with low pressure fluid received at the low pressure port.

In addition to one or more of the features described above, or as an alternative, further embodiments may include the manifold has a first selector seat fixed between the high pressure port and the actuator port and a second selector seat fixed between the first selector seat and the vent, the selector is disposed between the first selector seat and the second selector seat.

In addition to one or more of the features described above, or as an alternative, further embodiments may include that the biasing member is supported within the manifold between the second selector seat and the low pressure port.

In addition to one or more of the features described above, or as an alternative, further embodiments may include that the biasing member is supported within the manifold between the vent and the low pressure port.

In addition to one or more of the features described above, or as an alternative, further embodiments may include a plunger supported within the manifold, the plunger coupling the biasing member to the selector.

In addition to one or more of the features described above, or as an alternative, further embodiments may include that the plunger overlaps the vent along its length.

In addition to one or more of the features described above, or as an alternative, further embodiments may include that the manifold has a plunger guide fixed between the selector and the low pressure port, wherein the plunger is slidably disposed within the plunger guide.

In addition to one or more of the features described above, or as an alternative, further embodiments may include a seat member supported within the manifold, the seat member arranged between the biasing member and the low pressure port.

In addition to one or more of the features described above, or as an alternative, further embodiments may include that the seat member has a seat member flange portion, the biasing member fixed to the seat member flange portion.

In addition to one or more of the features described above, or as an alternative, further embodiments may include a plunger with a plunger flange portion, the plunger flange portion arranged on an end of the plunger opposite the selector, wherein the biasing member is fixed to the plunger flange portion.

In addition to one or more of the features described above, or as an alternative, further embodiments may include that the manifold has a fluid channel connecting the vent with each of the low pressure port, the high pressure port, and the actuator port, wherein the selector is disposed within the fluid channel between the high pressure port and the vent.

In addition to one or more of the features described above, or as an alternative, further embodiments may include a pneumatic conduit fixed to the actuator port, and a valve body having an exterior and an actuator chamber, the actuator chamber connected to the pneumatic conduit, the manifold fixed to the exterior of the valve body to provide low pressure fluid or high pressure fluid to the actuation chamber according to position of the selector.

In addition to one or more of the features described above, or as an alternative, further embodiments may include that the selector has a spherical shape, wherein the selector includes a ceramic material.

In addition to one or more of the features described above, or as an alternative, further embodiments may include that the manifold has a mount portion, the pneumatic controller having a valve body with an exterior, the mount portion connecting the manifold to the valve body.

In addition to one or more of the features described above, or as an alternative, further embodiments may include that the manifold has a mount portion, wherein the vent and the mount portion are on a common side of the manifold.

An inline valve includes a pneumatic controller as described above, a valve body, and a poppet. The manifold has a mount portion, the valve body has an exterior, an inlet, and an outlet, the mount portion of the manifold connecting the manifold to the exterior of the valve body. The poppet is supported within the valve body and is operably associated with the selector, wherein the poppet is movable between an actuator poppet seat and valve body poppet seat within the valve body, the inlet of the valve body in fluid communication with the outlet of the valve body when the poppet is against the actuator poppet seat, the poppet fluidly separating the inlet from the outlet when the poppet is against the valve body poppet seat.

In addition to one or more of the features described above, or as an alternative, further embodiments may include that the vent opposes the valve body to issue low pressure fluid received at the low pressure port toward the exterior of the valve body.

In addition to one or more of the features described above, or as an alternative, further embodiments may include the pneumatic controller comprises a first selector seat arranged between the high pressure port and the actuator port, a second selector seat arranged between the first selector seat and the vent, wherein the selector is arranged between the first selector seat and the second selector seat, a plunger supported within the manifold, the plunger coupling the biasing member to the selector, and a seat member supported within the manifold, the seat member arranged between the biasing member and the low pressure port.

A gas turbine engine includes a compressor having a bleed port, a high pressure stage downstream of the bleed port, and a low pressure stage upstream of the bleed port; a pneumatic controller as described above, wherein the high pressure stage is connected to the high pressure port, wherein the low pressure stage is connected to the low pressure port; and an inline valve with a valve body with an inlet and an outlet, wherein the inlet is in fluid communication with the bleed port of the compressor, wherein the pneumatic controller is mounted to an exterior of the valve body.

A method of controlling flow through an inline valve includes, at a pneumatic controller as described above, receiving a high pressure fluid at the high pressure port, receiving a low pressure fluid at the low pressure port, communicating one of the low pressure fluid and the high pressure fluid to the actuator port according to position of the selector, and cooling the biasing member by flowing the low pressure fluid across the biasing member and through the vent.

Technical effects of the present disclosure include the capability to provide passive control of inline valves without remotely-mounted, active control mechanisms such as solenoids. In embodiments described herein no external signals are required for active control of the inline valve. Technical effects also include valve bodies having relatively large flow area in comparison to inline valves having controllers located within the valve body of the inline valve. Technical effects additionally include controller active cooling, limiting (or eliminating entirely) the tendency of hot control fluid provided to inline valves altering valve performance.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
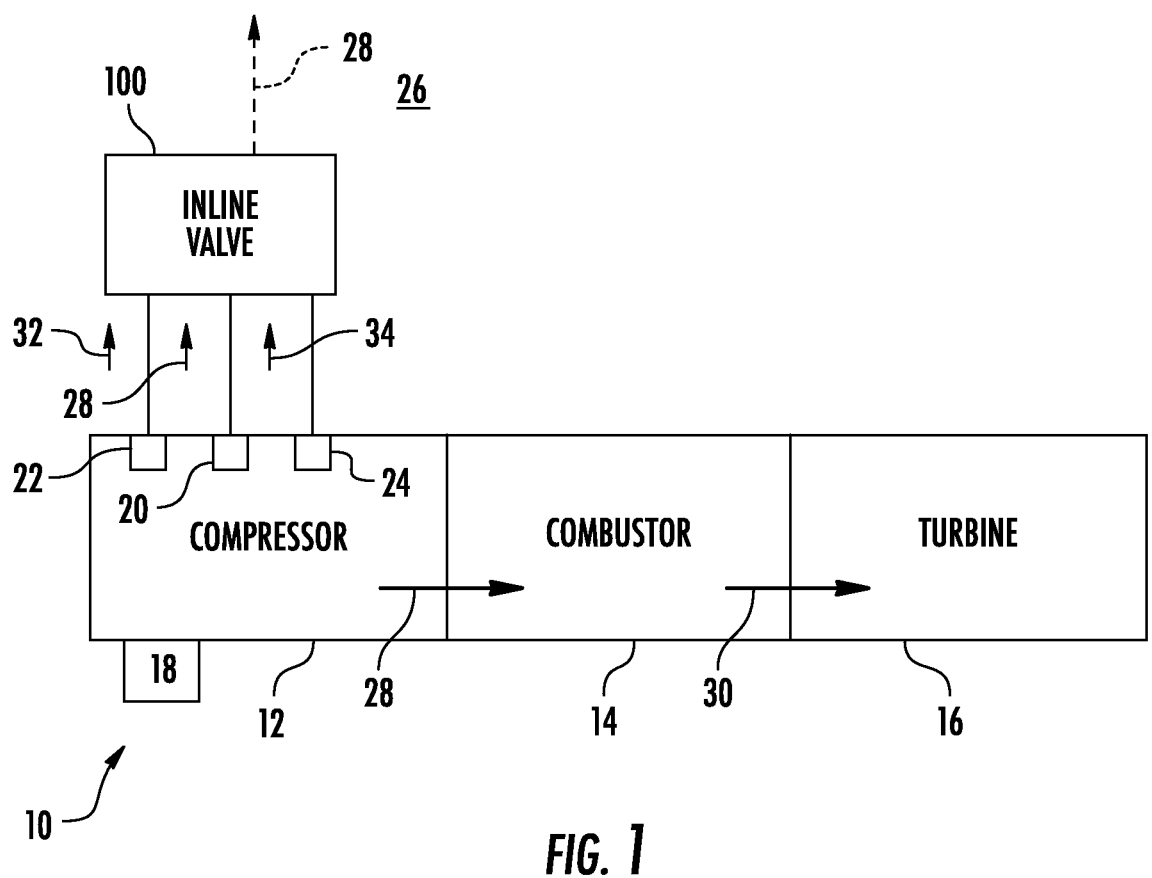
FIG. 1 is a schematic view of an inline valve constructed in accordance with the present disclosure, showing gas turbine engine compressor having a bleed port with the inline valve connected to the bleed port.

Reference will now be made to the drawings wherein like reference numerals identify similar structural features or aspects of the subject disclosure. For purposes of explanation and illustration, and not limitation, a partial view of an exemplary embodiment of a controller for an inline valve in accordance with the disclosure is shown in FIG. 1 and is designated generally by reference character 100. Other embodiments of controllers, inline valves, gas turbine engines and methods of controlling flow through inline valves in accordance with the present disclosure, or aspects thereof, are provided in FIGS. 2-6, as will be described. The systems and methods described herein can be used for pneumatically controlling passively actuated inline valves, such as bleed valves in gas turbine engines, though the present disclosure is not limited to controlling bleed flows in gas turbine engines or to gas turbine engines in general.

Referring to FIG. 1, a gas turbine engine 10 is shown. The gas turbine engine 10 includes a compressor 12, a combustor 14, and a turbine 16. The gas turbine engine 10 also includes a starter 18 and the inline valve 100.

The compressor 12 has a bleed port 20, a low pressure stage 22, and a high pressure stage 24. The low pressure stage 22 is arranged upstream (relative to a direction of fluid flow through the compressor 12) of the bleed port 20, the high pressure stage 24 is arranged downstream of the of the bleed port 20, and the compressor 12 is arranged to ingest and compress fluid from the external environment 26 to generate a working fluid flow 28, e.g., a compressed air flow. The combustor 14 is in fluid communication with the compressor 12 to receive the working fluid flow 28, and is arranged to generate therefrom a flow of high pressure combustion products 30. The turbine 16 is in fluid communication with the combustor 14 to extract energy from the flow of high pressure combustion products 30 to power the compressor 12.

The starter 18 is operably connected to the gas turbine engine 10 for starting the gas turbine engine 10. More specifically, the starter 18 is arranged to provide mechanical rotation to the compressor 12 during startup of the gas turbine engine 10 when power is unavailable from the turbine 16. To limit the power required during startup the inline valve 100 is connected to the bleed port 20. In this respect the inline valve 100 is arranged to provide fluid communication between the compressor 12 and the external environment 26 for passive actuation according to pressure within the compressor 12, as will be described.

In the illustrated embodiment the inline valve 100 is connected to the bleed port 20, the low pressure stage 22, and the high pressure stage 24. The low pressure stage 22 provides a flow of low pressure fluid 32, e.g., low pressure compressed air, to the inline valve 100. The high pressure stage 24 provides a flow of high pressure fluid 34, e.g., high pressure compressed air, to the inline valve 100. The bleed port 20 is in fluid communication with the inline valve 100 for selective fluid communication of a portion of the working fluid flow 28 with the external environment 26 according to operation of the bleed valve 100. It is contemplated that that the low pressure fluid 32 be relatively cool in comparison to the high pressure fluid 34. It is also contemplated that the flow of high pressure fluid 34 be of relatively high pressure and temperature in comparison to the flow of low pressure fluid 32, as will also be described. It is understood that this is for illustration purposes only and is non-limiting, and that other arrangements are possible and remain within the scope of the present disclosure.

Figure 2:
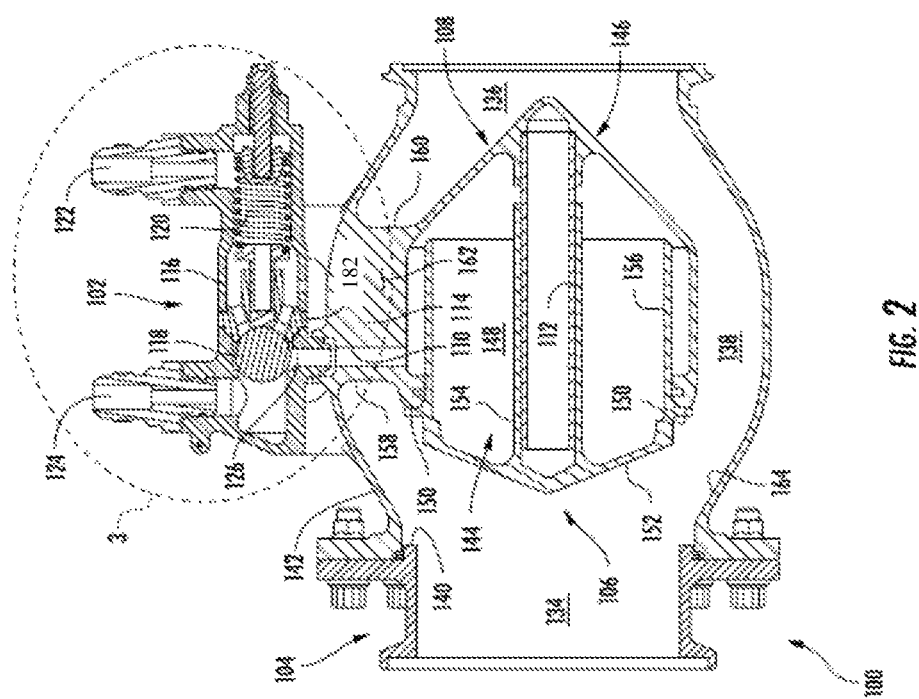
FIG. 2 is cross-sectional view of the inline valve of FIG. 1, showing a valve body with a poppet and an externally mounted controller for remotely communicating either a pressure of reference fluid or pressure of control fluid to the poppet.

With reference to FIG. 2, the inline valve 100 is shown. The inline valve 100 includes a pneumatic controller 102, valve body 104, and a poppet 106. The inline valve 100 also includes an actuator 108, a pneumatic conduit 110, a guide 112, and a fairing 114.

The pneumatic controller 102 generally includes a manifold 116, a selector 118, and a biasing member 120. The manifold 116 has a low pressure port 122, a high pressure port 124, an actuator port 126, and a vent 128. The selector 118 is movable within the manifold 116 between a first position 130 and a second position 132, the low pressure port 122 in fluid communication with the actuator port 126 in the first position 130, the high pressure port 124 in fluid communication with the actuator port 126 in the second position 132. The biasing member 120 is supported within the manifold 116 and urges the selector 118 towards the first position 130, the low pressure port 122 being in fluid communication with the vent 128 in both the first position 130 and the second position 132 to cool the biasing member 120 with low pressure fluid, e.g., the low pressure fluid 32 (shown in FIG. 1), received at the low pressure port 122.

The valve body 104 has an inlet 134, an outlet 136, and an interior 138. The valve body 104 also has a valve body poppet seat 140 and a valve body exterior 142. The poppet 106, the actuator 108, the guide 112, and the fairing 114 are arranged within the interior 138 of the valve body 104. The pneumatic controller 102 is connected to the valve body exterior 142. The pneumatic conduit 110 fluidly connects the actuator 108 to the pneumatic controller 102, the pneumatic conduit 110 extending through the valve body exterior 142 and seating in the actuator port 126 of the pneumatic controller 102.

The actuator 108 has an open end 144, a closed end 146, and defines an actuator chamber 148 and actuator poppet seat 150. The closed end 146 of the actuator 108 opposes the outlet 136 of the valve body 104. The open end 144 of the actuator 108 opposes the inlet 134 of the valve body 104. The actuator poppet seat 150 extends about the open end 144 of the actuator 108. The guide 112 is fixed to the actuator 108 and is arranged within the actuator chamber 148. The poppet 106 is slidably received within the actuator 108 and on the guide 112, the poppet 106 and the actuator 108 thereby bounding the actuator chamber 148. The pneumatic conduit 110 is fixed to the actuator 108 and provides fluid communication between the pneumatic controller 102 and the actuator chamber 148.

The poppet 106 has a face portion 152, a guide portion 154, and a skirt portion 156. The face portion 152 opposes the inlet 134 of the valve body 104. The guide portion 154 of the poppet 106 extends from the face portion 152, towards the outlet 136 of the valve body 104, and is slidably received on the guide 112. The skirt portion 156 of the poppet 106 extends from the face portion 152 of the poppet 106 at a location radially outward of the guide portion 154 of the poppet 106, extends towards the outlet 136 of the valve body 104, and is slidably received within the actuator 108.

The fairing 114 extends about the pneumatic conduit 110 and couples the actuator 108 to the valve body 104. In this respect the fairing 114 has a leading edge 158, a trailing edge 160, and a fairing body 162. The leading edge 158 of the fairing 114 opposes the inlet 134 of the valve body 104 and extends between an interior surface 164 of the valve body 104 and the actuator 108. The trailing edge 160 of the fairing 114 extends between the interior surface 164 of the valve body 104 and the actuator 108 at a location downstream of the leading edge 158 of the fairing 114, and opposes the outlet 136 of the valve body 104. The fairing body 162 extends between the leading edge 158 and the trailing edge 160 of the fairing 114.

Figure 3:
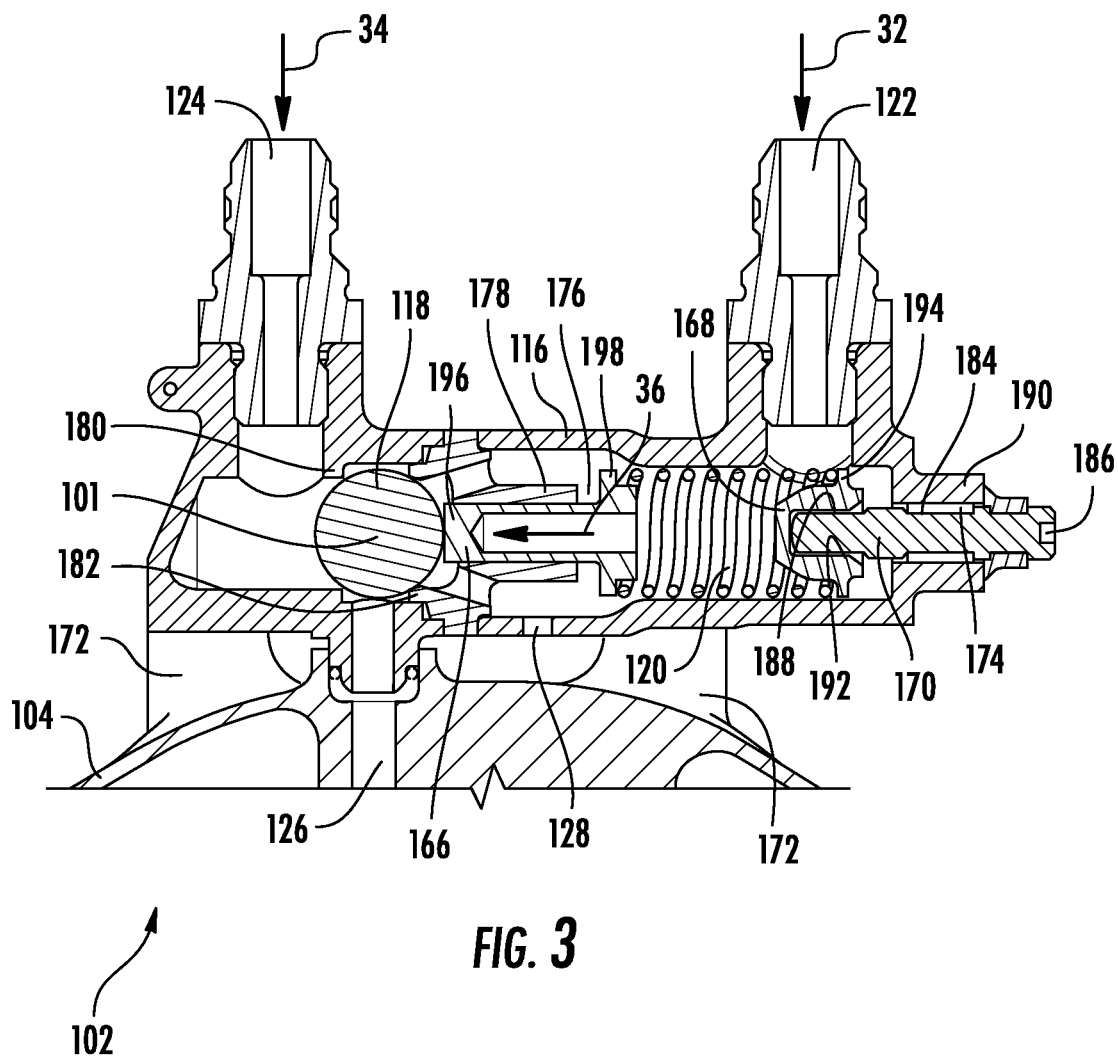
FIG. 3 is a cross-sectional view of a portion of the inline valve of FIG. 1 including the pneumatic controller, showing a vent defined between the pneumatic controller low pressure port and the pneumatic controller high pressure port to cool a biasing member supported within the pneumatic controller.

With reference to FIG. 3, the pneumatic controller 102 is shown. The pneumatic controller 102 includes the manifold 116, the selector 118, and a plunger 166. The pneumatic controller also includes the biasing member 120, a seat member 168, and a bias-set screw 170.

The manifold 116 has a mount portion 172, a bias-set screw port 174, and a manifold exterior 190, and defines within its interior a fluid channel 176. The mount portion 172 connects the manifold 116 to the valve body 104 and extends between the manifold 116 the valve body exterior 142, the pneumatic controller 102 and the valve body 104 form a unitary assembly or end item. The fluid channel 176 connects the bias-set screw port 174 with the low pressure port 122, the high pressure port 124, and the actuator port 126. A plunger guide 178 is fixed between the selector 118 and the low pressure port 122.

A first selector seat 180 and a second selector seat 182 are arranged within the fluid channel 176. More specifically, the first selector seat 180 is arranged within the fluid channel 176 between high pressure port 124 and the actuator port 126. The second selector seat 182 is arranged within the fluid channel 176 between the first selector seat 180 and the vent 128. The selector 118, the plunger 166, the biasing member 120, and the seat member 168 are each disposed within the fluid channel 176. In this respect the selector 118 is disposed between the first selector seat 180 and the second selector seat 182. The plunger 166 is disposed between the selector 118 and the biasing member 120. The biasing member 120 is disposed between the vent 128 and the low pressure port 122, and is also disposed between the second selector seat 182 and the low pressure port 122. The seat member 168 is disposed between the bias-set screw 170 and the seat member 168. It is contemplated that the biasing member 120 can include a spring and/or a flexure, as suitable for an intended application.

The bias-set screw 170 has a threaded segment 184, a tool engagement feature 186, and a smooth segment 188. The threaded segment 184 is threadedly disposed within the seat member 168. The tool engagement feature 186 is adjacent to the threaded segment 184, e.g., on a side of the threaded segment 184 opposite the seat member 168, and is disposed on the manifold exterior 190. The smooth segment 188 is adjacent to the threaded segment 184, e.g., on a side of the threaded segment 184 opposite the tool engagement feature 186 and within the fluid channel 176, and is rotatably received within the seat member 168.

The seat member 168 is supported within the manifold 116 between the biasing member 120 and the bias-set screw port 174, defines a set screw socket 192, and has a seat member flange portion 194. The set screw socket 192 is defined on a side of the seat member 168 opposite the biasing member 120 and the bias-set screw 170 is slidably received within the set screw socket 192. More specifically, the smooth segment 188 of the bias-set screw 170 is slidably received within the set screw socket 192 for rotation relative to the seat member 168. The seat member flange portion 194 extends about the seat member 168 and biasing member 120, e.g., an end of the biasing member 120 opposite the plunger 166, is seated of the seat member flange portion 194.

The plunger 166 is supported within the manifold 116 and couples the biasing member 120 to the selector 118. More specifically, the plunger 166 is slidably received within the plunger guide 178, overlaps the vent 128 along its length, and has a selector face 196 and a plunger flange portion 198. The plunger flange portion 198 extends circumferentially about the plunger 166 and the biasing member 120, e.g., at an end of the biasing member 120 opposite the seat member 168, and is seated on the plunger flange portion 198. The selector face 196 opposes the selector 118 and is tangent to the selector 118. In this respect it is contemplated that the selector 118 have a spherical shape. In certain embodiments the selector 118 can additionally include a ceramic material 101. It is contemplated the ceramic material 101 can be disposed on the selector as a coating, reducing wear of the selector 118 and the internal structure of the manifold 116. It is also contemplated that selector 118 can be formed entirely from the ceramic material 101. Forming the selector 118 entirely of the ceramic material 101 has the further benefit of reducing weight of the pneumatic controller 102. Examples of suitable ceramic materials include silicon nitride.

The biasing member 120 is compressively supported between the selector 118 and the bias-set screw 170. In this respect the biasing member 120 urges the selector 118 towards the first selector seat 180 with a biasing force 36. The biasing force 36 in turn has a magnitude that depends, at least in part, upon the advancement (or retraction) of the bias-set screw 170 within the bias-set screw port 174. For example, advancing the bias-set screw 170 within the bias-set screw port 174 increases magnitude of the biasing force 36. Increase of the biasing force 36 in turn increases the pressure differential required across the high pressure port 124 and the low pressure port 122 required to move the selector 118 from the first position 130 (shown in FIG. 4) to the second position 132 (shown in FIG. 5). Oppositely, retracting the bias-set screw 170 from the bias-set screw port 174 reduces the magnitude of the biasing force 36 and reduces the pressure differential required across the high pressure port 124 and the low pressure port 122 required to move the selector 118 from the first position 130 to the second position 132. As the tool engagement feature 186 is located outside of the pneumatic controller 102 and the valve body 104, the pressure differential can be adjusted with the inline valve in-situ, e.g., while installed in the gas turbine engine 10 (shown in FIG. 1), simplifying installation and service of the inline valve 100 and the gas turbine engine 10.

As will be appreciated by those of skill in the art in view of the present disclosure, the working fluid flow 28 (shown in FIG. 1) can be of temperature in excess of the maximum operating temperature of the biasing member 120. This can potentially cause the biasing member 120 to shift in performance and/or fail over time. To prevent performance shift and/or failure the manifold 116 includes the vent 128.

The vent 128 is in fluid communication with the low pressure port 122, is arranged on a side of the biasing member 120 opposite the low pressure port 122, and is open to the external environment 26. So located the flow of low pressure fluid 32 received at the low pressure port 122 to traverse the biasing member 120 and issue to the external environment 26, thermally insulating (and/or cooling) the biasing member 120 from structures of the inline valve 100 heated by the working fluid flow 28. It is contemplated that the vent 128 be positioned such that the selector 118 is disposed within the fluid channel 176 between the high pressure port 124 and the vent 128, the flow of low pressure fluid 32 thereby flowing from the low pressure port 122 to the vent 128 when the selector is in both the first position 130 (shown in FIG. 4) and the second position 132 (shown in FIG. 5), the biasing member 120 thereby being thermally insulated (and/or cooled) irrespective of the position of the selector 118. As shown in FIG. 3 the vent 128 and the mount portion 172 are located on a common side of the manifold 116 such that the vent opposes the valve body 104. This causes the flow of low pressure fluid 32 issuing from the vent 128 to flow across the valve body 104, cooling the valve body 104 and limiting (or eliminating entirely) the need to provide additional coolant to the valve body 104.

Figure 4:
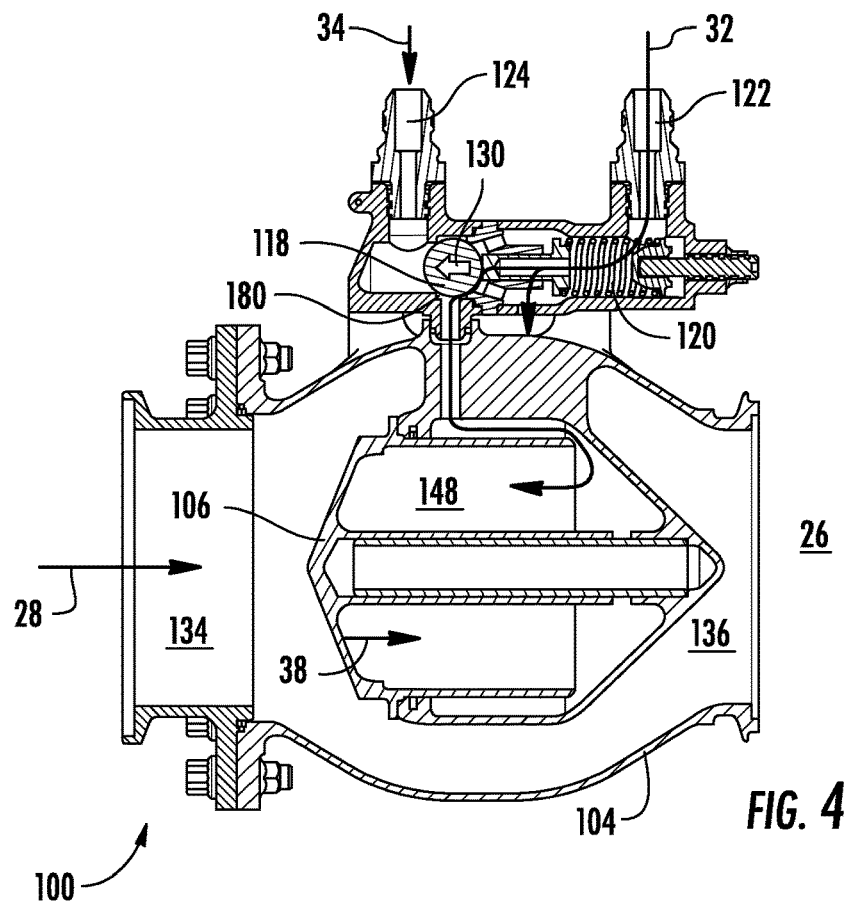
FIG. 4 is a cross-sectional view of the inline valve of FIG. 1, showing the selector in a first position and controller thereby communicating a flow of low pressure fluid to the poppet while cooling the biasing member with low pressure fluid.

With reference to FIG. 4, the inline valve 100 is shown with the selector 118 in the first position 130. The selector 118 moves to the first position 130 when the sum of the biasing force 36 (shown in FIG. 3) and force exerted on the selector 118 by the flow of low pressure fluid 32 exceeds the force exerted on the selector 118 by the flow of high pressure fluid 34. When this condition exists the selector 118 moves to the first position 130, wherein the selector 118 abuts the first selector seat 180. Abutment of the selector 118 with the first selector seat 180 places the low pressure port 122 in fluid communication with the actuator chamber 148. Fluid communication between the low pressure port 122 and the actuator chamber 148 in turn pressurizes the actuator chamber 148 according to the pressure of the flow of low pressure fluid 32.

When pressure of the working fluid flow 28 reaches pressure sufficient to overcome pressure of the flow of low pressure fluid 32 within the actuator chamber 148, the inline valve 100 passively opens 38, i.e., the poppet 106 moves from the valve body poppet seat 140 to the actuator poppet seat 150. Once the poppet 106 is against the actuator poppet seat 150 the inlet 134 of the valve body 104 is in fluid communication with the outlet 136 of the valve body 104, the compressor 12 (shown in FIG. 1) thereby being in fluid communication with the external environment 26 through the valve body 104. The compressor 12 is thereby able to increase pressure of the working fluid flow 28 without having to fully pressurize the working fluid flow 28 due to the venting provided through the inline valve 100 to the external environment 26, reducing the input energy required to start the gas turbine engine 10 (shown in FIG. 1). Notably, the flow of low pressure fluid 32 received at the low pressure port 122 traverses the biasing member 120, insulating (and/or cooling) the biasing member 120, and thereafter issues from the pneumatic controller 102 through the vent 128 while the selector is in the first position 130.

Figure 5:
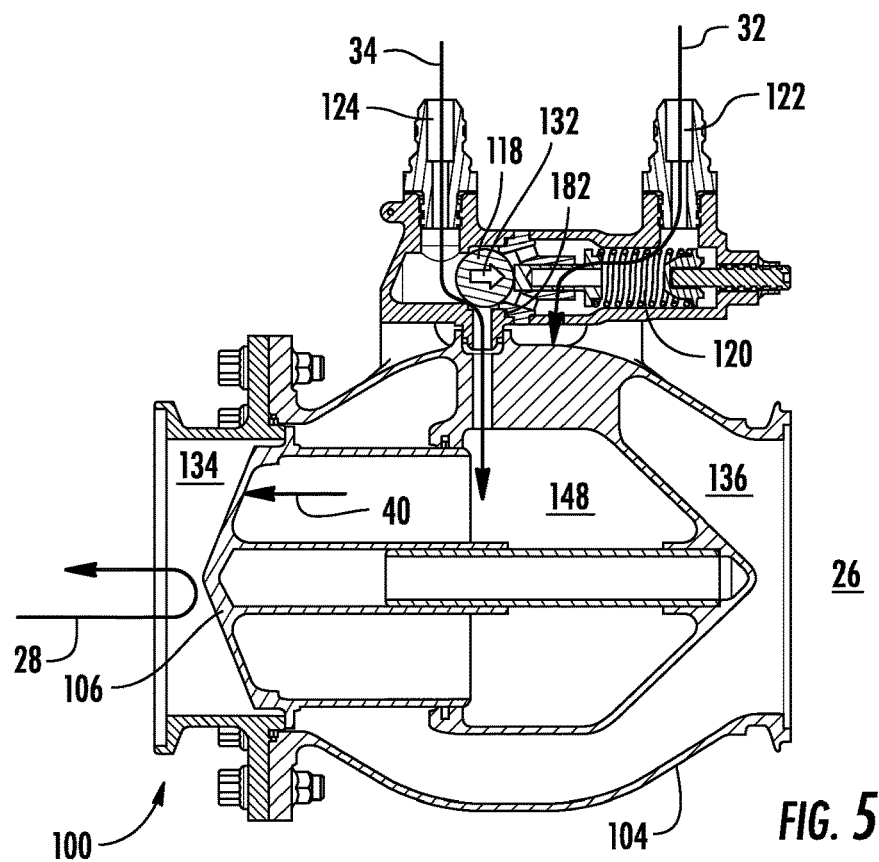
FIG. 5 is a cross-sectional view of the inline valve of FIG. 1, showing the selector in a second position and the pneumatic controller thereby communicating a flow of high pressure fluid to the poppet while cooling the biasing member with low pressure fluid.

With reference to FIG. 5, the inline valve 100 is shown with the selector 118 in the second position 132. The selector 118 moves to the second position 132 when the sum of the biasing force 36 (shown in FIG. 3) and force exerted on the selector 118 by the flow of low pressure fluid 32 falls below the force exerted on the selector 118 by the flow of high pressure fluid 34. When this condition exists the selector 118 moves to the second position 132, wherein the selector 118 abuts the second selector seat 182. Abutment of the selector 118 with the second selector seat 182 places the high pressure port 124 in fluid communication with the actuator chamber 148. Fluid communication between the high pressure port 124 and the actuator chamber 148 in turn pressurizes the actuator chamber 148 according to the pressure of the flow of high pressure fluid 34. Notably, the flow of low pressure fluid 32 received at the low pressure port 122 traverses the biasing member 120, insulating (and/or cooling) the biasing member 120, and thereafter issues from the pneumatic controller 102 through the vent 128 while the selector is in the second position 132.

When pressure of the flow of high pressure fluid 34 reaches pressure sufficient to overcome force exerted on the poppet 106 by the working fluid flow 28, the inline valve 100 passively closes 40, i.e., the poppet 106 moves from the actuator poppet seat 150 and against the valve body poppet seat 140. Once against the valve body poppet seat 140 the poppet 106 fluidly separates the outlet 136 of the valve body 104 from the inlet 134 of the valve body 104. This ceases fluid communication between the compressor 12 (shown in FIG. 1) and the external environment 26 through the inline valve 100.

Figure 6:
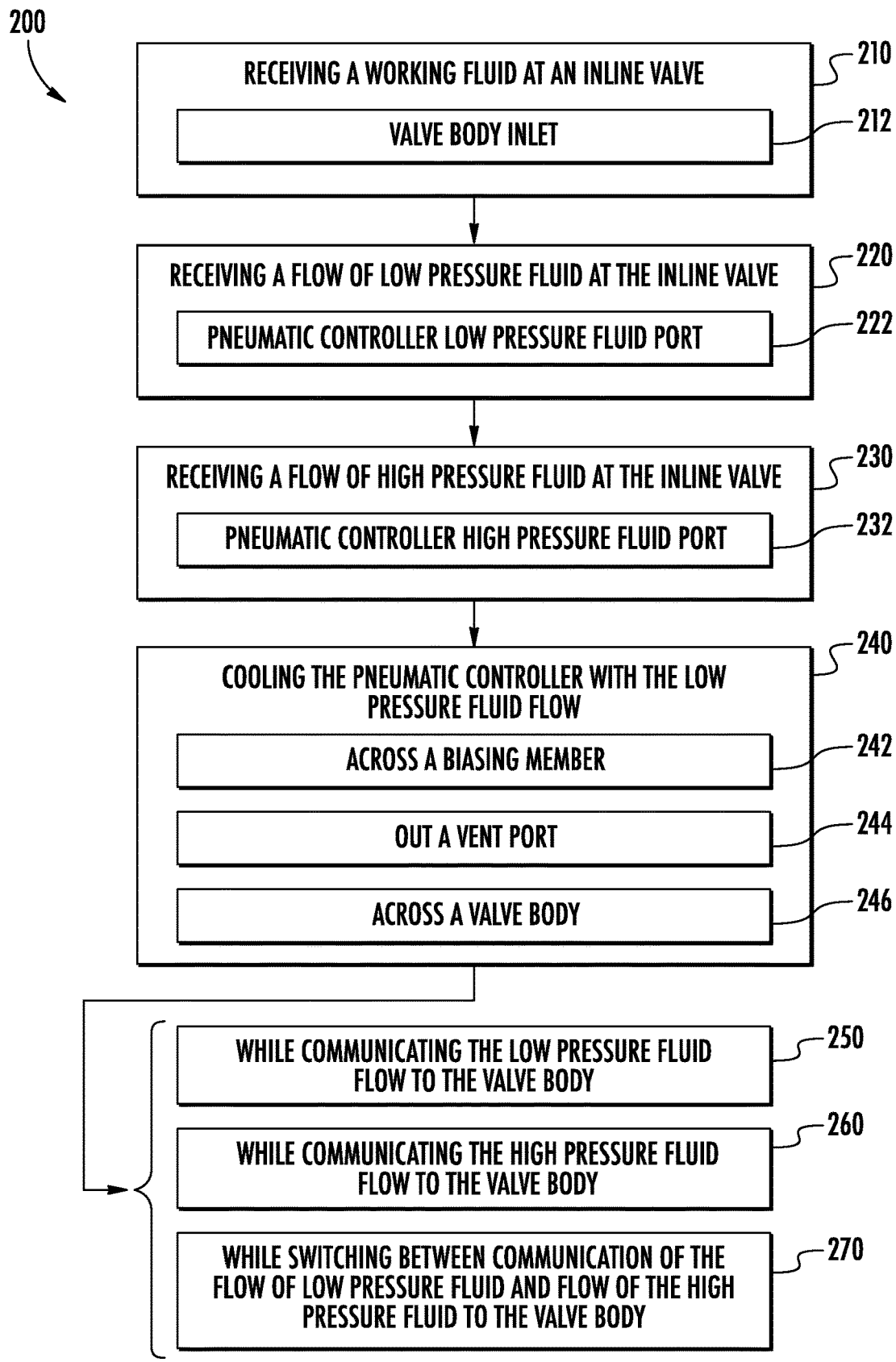
FIG. 6 is a block diagram of a method of controlling fluid flow through an inline valve, showing steps of the method according to an illustrative and non-limiting embodiment of the method.

With reference to FIG. 6, a method 200 of controlling flow through an inline valve, e.g., the inline valve 100, is shown. Method 200 includes receiving a working fluid flow, e.g., the working fluid flow 28 (shown in FIG. 1), at the inline valve, as shown with box 210. Method 200 also includes receiving a flow of high pressure fluid, e.g. the flow of high pressure fluid 34 (shown in FIG. 1) at the inline valve, as shown with box 220. The method 200 additionally includes receiving a flow of low pressure fluid, e.g., the low pressure fluid 32 (shown in FIG. 1), at the inline valve, as shown with box 230. It is contemplated that the flow of low pressure fluid be received at a low pressure port of the inline valve, e.g., the low pressure port 122 (shown in FIG. 2), the flow of high pressure fluid be received at a high pressure port of the inline valve, e.g., the high pressure port 124 (shown in FIG. 2), and that the working fluid flow be received at an inlet of the inline valve, e.g., the inlet 134 (shown in FIG. 2), as shown by boxes 212, 222, and 232.

As shown with box 240, a portion of the low pressure fluid flows through a pneumatic controller of the inline valve, e.g., the controller 102 (shown in FIG. 2), cooling the pneumatic controller. In this respect the portion of the low pressure fluid flows across a biasing member supported within the pneumatic controller, e.g., the biasing member 120 (shown in FIG. 2), as shown with box 242, and out a vent port of the pneumatic controller, e.g., the vent port 128 (shown in FIG. 2) and into the ambient environment, as shown with box 244. As shown with box 246, the portion of the flow of low pressure fluid is directed by the vent port to a valve body of the inline valve, e.g., the valve body 104 (shown in FIG. 2).

As shown with box 250, the portion of the low pressure fluid flows through the vent and cools the biasing member while low pressure fluid is communicated to the valve body of the inline valve. As shown with box 260, low pressure fluid flows through the vent and cools the biasing member while high pressure fluid communicated to the valve body of the inline valve. As shown box 270, the biasing member can be cooled while switching between communication of the flow of low pressure fluid and the flow of high pressure fluid to the valve body.

Inline valves can be operated by selectively applying muscle pressure for actuation of the inline valve using pneumatic controllers. In controllers employing springs the air being controlled can be above the temperature at which the mechanical properties of the material forming the spring changes, potentially causing the spring performance to change and/or causing premature failure of the spring.

In embodiments described herein pneumatic controllers are employed having a high pressure port, a low pressure port, an actuator port, and a vent. The pneumatic controller connects the low pressure port or the high pressure port to the actuator port according to relative pressures of fluids received at the ports and the spring constant of a resilient member supported within the pneumatic controller, and cools the resilient member by flowing low pressure fluid received at the low pressure port across the resilient member and out the vent. This ensures that the resilient member remains insulated from heat by flow of low pressure fluid irrespective of the state of the valve, the resilient member remaining at a known temperature and within the temperature range of the material forming the resilient member, the resilient member thereby having more predictable spring characteristics than were ambient convective cooling employed.

In certain embodiments the present disclosure enables resilient members to be employed in environments which would otherwise be prohibitive due to the associated loadings and temperatures of the application. Further, cooling the resilient member with forced convection from a low pressure fluid source flowing across the resilient member and into the external environment allows temperature of the resilient member to be accurately predicted, reducing the tendency of such inaccuracy to result in resilient member performance and/or failures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An inline valve, comprising:
    a valve having a valve body; and a pneumatic controller connected to the valve body, the pneumatic controller comprising:

a manifold having a low pressure port, a high pressure port, an actuator port, and a vent;

a selector movable within the manifold between a first position and a second position, the low pressure port in fluid communication with the actuator port in the first position, the high pressure port in fluid communication with the actuator port in the second position;

a biasing member supported within the manifold and urging the selector towards the first position, wherein the low pressure port is in fluid communication with the vent in both the first position and the second position to cool the biasing member with low pressure fluid received at the low pressure port a first selector seat fixed between the high pressure port and the actuator port in a first chamber; and a second selector seat fixed between the first selector seat and the vent, wherein the selector is disposed between the first selector seat and the second selector seat in a second chamber;

wherein the biasing member, the vent and the low pressure port are all in the second chamber of the manifold.

2. The inline valve of claim 1, wherein the biasing member is supported within the manifold between the second selector seat and the low pressure port.

3. The inline valve of claim 1, wherein the biasing member is supported within the manifold between the vent and the low pressure port.

4. The inline valve of claim 1, further comprising a plunger supported within the manifold, the plunger coupling the biasing member to the selector.

5. The inline valve of claim 4, wherein the plunger overlaps the vent along its length.

6. The inline valve of claim 4, wherein the manifold has a plunger guide fixed between the selector and the low pressure port, wherein the plunger is slidably disposed within the plunger guide.

7. The inline valve of claim 1, further comprising a seat member supported within the manifold, the seat member arranged between the biasing member and the low pressure port.

8. The inline valve of claim 7, wherein the seat member has a seat member flange portion, wherein the biasing member is fixed to the seat member flange portion.

9. The inline valve of claim 7, further comprising a plunger with a plunger flange portion, the plunger flange portion arranged on an end of the plunger opposite the selector, wherein the biasing member is fixed to the plunger flange portion.

10. The inline valve of claim 1, wherein the manifold has a fluid channel connecting the vent with each of the low pressure port, the high pressure port, and the actuator port, wherein the selector is disposed within the fluid channel between the high pressure port and the vent.

11. The inline valve of claim 1, further comprising:
a pneumatic conduit fixed to the actuator port; and
a valve body having an exterior and an actuator chamber, the actuator chamber connected to the pneumatic conduit, wherein the manifold is fixed to the exterior of the valve body to provide low pressure fluid or high pressure fluid to the actuation chamber according to position of the selector.

12. The inline valve of claim 1, wherein the selector has a spherical shape, wherein the selector includes a ceramic material.

13. The inline valve of claim 1, wherein the manifold has a mount portion, and further comprising a valve body with an exterior, the mount portion connecting the manifold to the valve body.

14. The inline valve of claim 1, wherein the manifold has a mount portion, wherein the vent and the mount portion are on a common side of the manifold.

15. The inline valve of claim 1,
wherein the manifold has a mount portion;
wherein the valve body includes an exterior, an inlet, and an outlet, wherein the mount portion of the manifold connects the manifold to the exterior of the valve body; and further comprising:
a poppet supported within the valve body and operably associated with the selector, wherein the poppet is movable between an actuator poppet seat and valve body poppet seat within the valve body, the inlet of the valve body in fluid communication with the outlet of the valve body when the poppet is against the actuator poppet seat, the poppet fluidly separating the inlet from the outlet when the poppet is against the valve body poppet seat.

16. The inline valve of claim 15, wherein the vent opposes the valve body to issue low pressure fluid received at the low pressure port toward the exterior of the valve body.

17. An gas turbine engine, comprising:
a compressor having a bleed port, a high pressure stage downstream of the bleed port, and a low pressure stage upstream of the bleed port;
an inline valve as recited in claim 1,
wherein the high pressure stage is connected to the high pressure port, wherein the low pressure stage is connected to the low pressure port; and
wherein the valve body includes an inlet and an outlet, wherein the inlet is in fluid communication with the bleed port of the compressor, wherein the pneumatic controller is mounted to an exterior of the valve body.

* * * * *